United States Patent [19]

Tobayama et al.

[11] Patent Number: 5,924,537
[45] Date of Patent: Jul. 20, 1999

[54] ELECTROMAGNETIC CLUTCH HAVING A STATOR HOUSING WITH A THROUGH HOLE

[75] Inventors: Masashi Tobayama, Obu; Akira Kishibuchi, Nagoya; Junichi Ohguchi, Toyoake, all of Japan

[73] Assignee: Denso Corporation, Kariya, Japan

[21] Appl. No.: 08/784,318

[22] Filed: Jan. 16, 1997

[30] Foreign Application Priority Data

Jan. 18, 1996 [JP] Japan .................................. 8-006365

[51] Int. Cl.⁶ ........................................................ F16D 27/00
[52] U.S. Cl. .............................. 192/84.961; 192/84.96; 336/96; 335/296
[58] Field of Search ........................... 192/84.96, 84.961; 335/296, 297; 336/96

[56] References Cited

U.S. PATENT DOCUMENTS 4,296,851  10/1981  Pierce .................................. 192/84.961

FOREIGN PATENT DOCUMENTS

A-7-167164  7/1995  Japan .

Primary Examiner—Charles A. Marmor
Assistant Examiner—Ankur Parekh
Attorney, Agent, or Firm—Harness, Dickey & Pierce, PLC

[57] ABSTRACT

A stator housing of an electromagnetic clutch has a receiving portion for receiving an exciting coil and a bottom with through holes. The through holes are formed by pressing so as to have a tapered portion, a cross-sectional area of which becomes large toward the opposite side of the exciting coil. The exciting coil is received in the receiving portion so as to face the through holes and fixed by a molded resin which is filled into a space between the exciting coil and the receiving portion as well as the through holes. Accordingly, a fixing structure for preventing the exciting coil and the mold resin from coming out of the stator housing can be provided with low cost and high productivity.

21 Claims, 10 Drawing Sheets

$d_2 = (1.05 \sim 1.25) d_1$
$\ell \geq 0.41 t$

SHEAR SURFACE    FRACTURE SURFACE

ELECTROMAGNETIC CLUTCH HAVING A STATOR HOUSING WITH A THROUGH HOLE

CROSS-REFERENCE TO RELATED APPLICATION

This application is based upon and claims the benefit of priority of the prior Japanese Patent Application No. Hei. 8-6365 filed on Jan. 18, 1996, the content of which is incorporated herein by reference.

BACKGROUND OF THE INVENTION

1. Field of the Invention

The present invention relates to a stator housing of an electromagnetic clutch and a method for forming a through hole in the stator housing.

2. Description of Related Art

A stator of an electromagnetic clutch includes an exciting coil wound around a spool and a stator for holding the exciting coil. After being received in a receiving portion having a U-shaped cross section, which is formed in the stator housing, the exciting coil is fixed by injecting and molding resin into a space between the exciting coil and the holding portion. In this case, because the receiving portion has an open end at one side in an axial direction thereof, it is necessary to prevent the molded resin with the exciting coil from coming out of the receiving portion.

Figure 15:
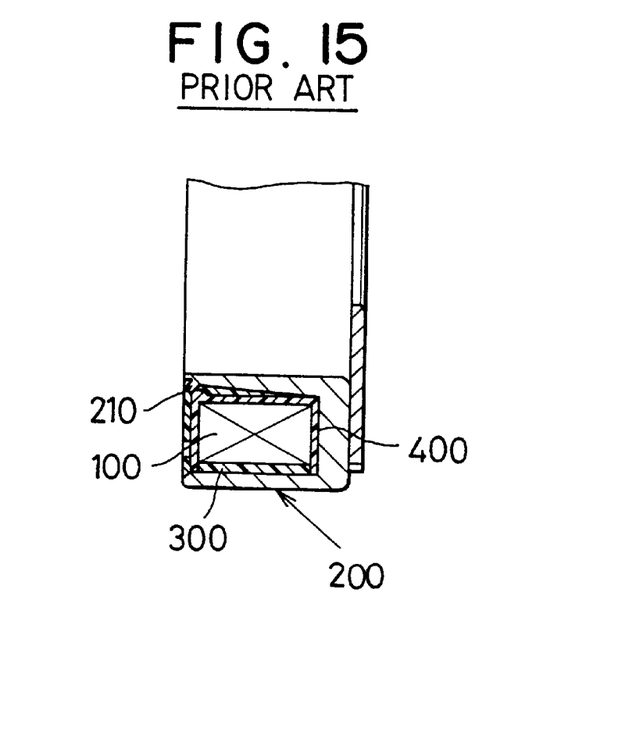
FIG. 15 is a cross-sectional view showing a coil receiving portion of a stator housing according to a conventional method.
Figure 16:
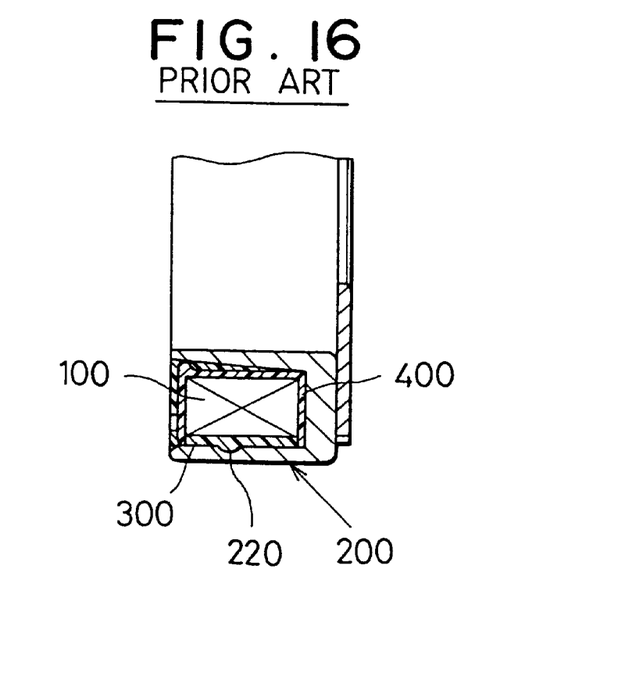
FIG. 16 is a cross-sectional view showing a coil receiving portion of a stator housing according to another conventional method.

As methods for preventing the molded resin from coming out, a method using a staked fixing structure shown in FIG. 15 and a method using a dimpling fixing structure shown in FIG. 16 have been proposed. In the staked fixing method, at the closing of a molding die unit before the resin is injected into and molded in the receiving portion 200 for receiving the coil 100, a plurality of staked portions 210 are formed at an opening end of the receiving portion 200 by a staking punch provided on an upper molding die of the die unit. Then, the staked portions 210 are staked to prevent the molded resin 300 from coming out of the receiving portion 200.

On the other hand, in the dimpling fixing method, a dimple portion (concave portion) 220 is formed at an inner peripheral surface of the receiving portion 200, and the resin 300 is injected into the dimple portion 220. Accordingly, the molded resin 300 is restricted from moving in an axial direction and a circumferential direction of the receiving portion 200, thereby being prevented from coming out of the receiving portion 200.

In the staking fixing method, however, because the staking process is added and the staking punch should be changed, the manufacturing cost rises. In the dimpling fixing structure, when the receiving portion 200 is formed by squeezing, the dimple portion 220 having been formed on the wall of the receiving portion 200 in advance is easily broken, and it is difficult to maintain the shape of the dimple portion 220. Therefore, a defective molded resin 300 may be caused. To stabilize the shape of the dimple portion, the number of process steps increases Therefore, the productivity is deteriorated and the manufacturing cost increases.

SUMMARY OF THE INVENTION

The present invention has been accomplished in view of the above-mentioned problems, and an object of the present invention is to provide a stator housing of an electromagnetic clutch, for receiving an exciting coil, capable of preventing the exciting coil from coming out of the stator housing, with low cost and high productivity.

According to the present invention, an electromagnetic clutch includes a stator housing having a receiving portion for receiving the exciting coil and a bottom with a through hole. The exciting coil is fixed in the receiving portion by a molded resin which is filled into a space including the through hole between the exciting coil and the stator housing. The through hole has an engaging portion to prevent the molded resin from moving.

Preferably, the through hole is formed in a tapered shape or a step shape, so that an opening area of the through hole at a side of the exciting coil is smaller than that at the other side.

As a result, the molded resin is prevented from moving, thereby being prevented from coming out of the stator housing, with the exciting coil. This fixing structure can be provided with low cost and high productivity More preferably, the through hole is formed by pressing from an inner side of the stator housing to the other side. Accordingly, the through hole may have a shear plane formed in a round-hole shape at the inner side and a fracture plane formed in a tapered shape at the other side. In this case, it is not necessary to form the tapered portion in the through hole after the through hole is opened, thereby the manufacturing process being simplified.

Other objects and features of the present invention will become more readily apparent from a better understanding of the preferred embodiments described below with reference to the following drawing figures.

DETAILED DESCRIPTION OF THE PREFERRED EMBODIMENTS

Embodiments according to the present invention will be described hereinafter with reference to the drawings.

Figure 1:
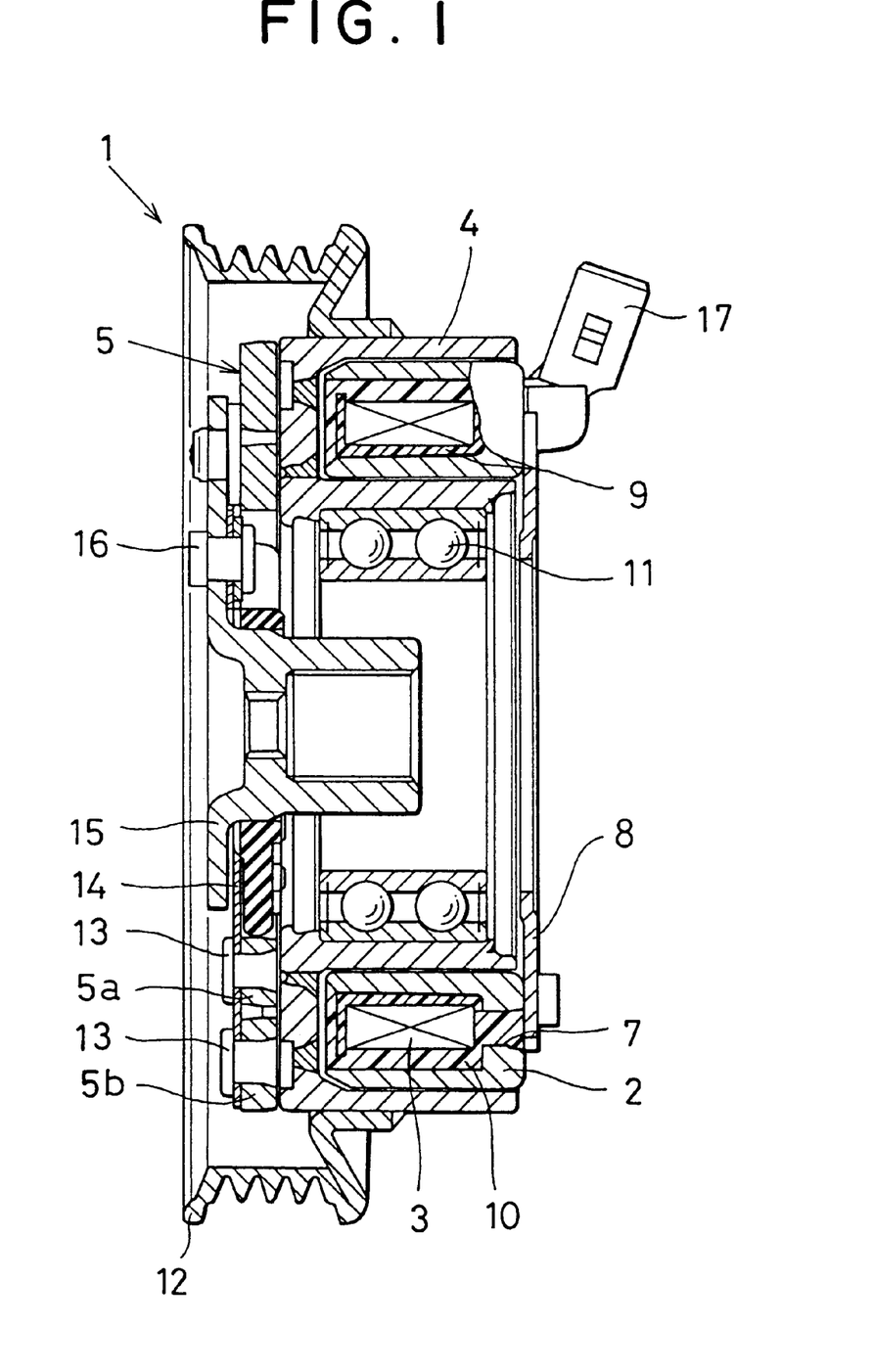
FIG. 1 is a cross-sectional view showing an electromagnetic clutch in a first embodiment according to the present invention.
Figure 2:
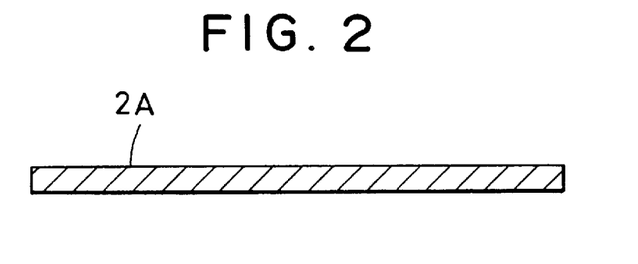
FIG. 2 is a schematic view for explaining a manufacturing process of a stator housing in the first embodiment.
Figure 3:
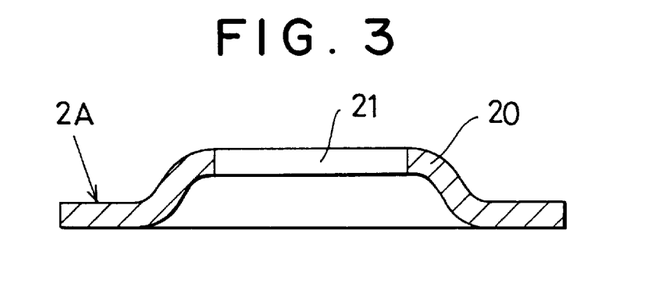
FIG. 3 is another schematic view for explaining a manufacturing process of a stator housing in the first embodiment.

A first embodiment will be described with reference to FIGS. 1 to 9. As shown in FIG. 1, an electromagnetic clutch 1 includes a stator housing 2, an exciting clutch 3, a rotor 4, an armature 5, and a hub assembly (described later).

Figure 5:
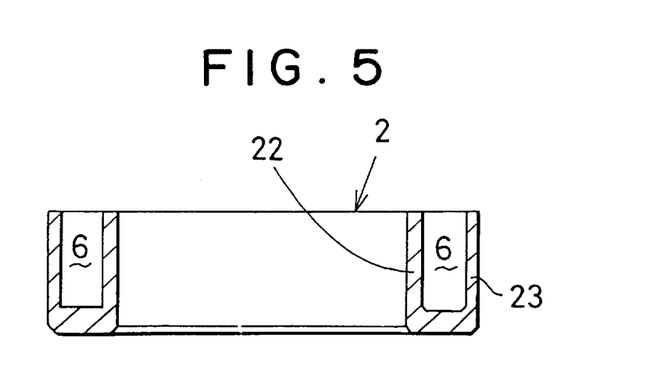
FIG. 5 is another schematic views for explaining a manufacturing process of a stator housing in the first embodiment.
Figure 6A:
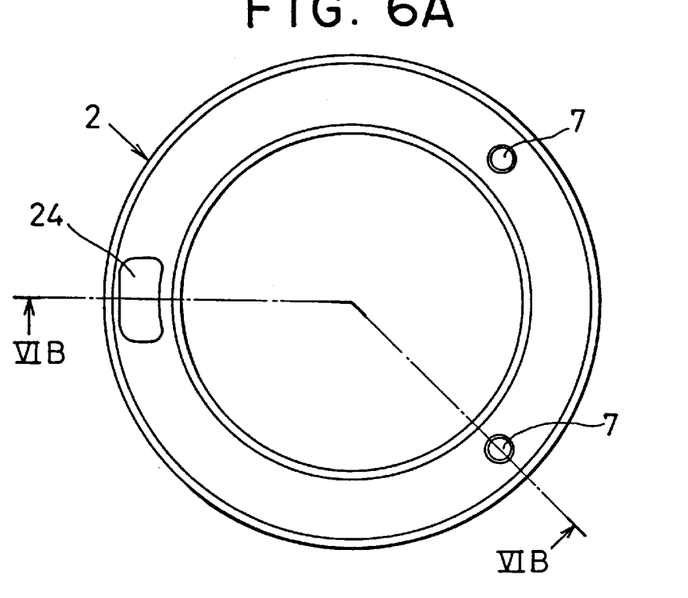
FIG. 6A is a front view showing the stator housing viewed from an arm support side in the first embodiment.
Figure 6B:
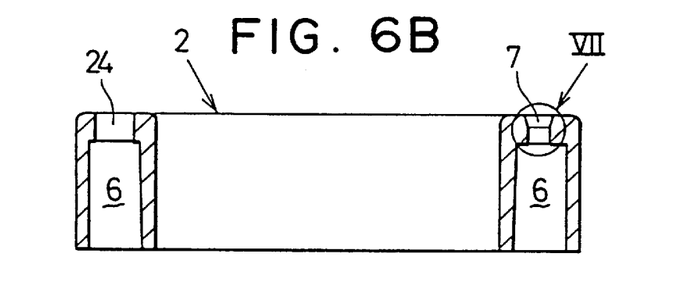
FIG. 6B is a cross-sectional view taken along the VIB—VIB line in FIG. 6A showing the stator housing.

The stator housing 2 includes a receiving portion 6 (refer to FIG. 5) having a U-shaped cross section, for receiving the exciting coil 3, and a plurality of through holes 7 (two holes in this embodiment) are formed on a bottom of the receiving portion 6 as shown in FIG. 6. To the bottom at a side opposite to the opening of the receiving portion 6, an arm support 8 (a support member) is fixed by welding or the like. By fixing the arm support 8 to a housing (not shown) of a refrigerant compressor (not shown), the stator housing 2 is positioned in the axial direction thereof (left-right direction in FIG. 1) .

The exciting coil 3 includes a spool 9 made of resin and a coil covered with a insulation film The coil is wound around the spool at predetermined rounds. The exciting coil 3 is received in the receiving portion 6 and then is fixed by a resin 10 injected into and molded in a space between the receiving portion 6 and the exciting coil 3. The spool 9 has U-shaped grooves (not shown) at the side wall thereof so as to communicate with the through holes 7 formed on the bottom of the receiving portion 6 at positions in correspondence to the through holes 7.

The rotor 4 (a rotating member) is formed in a ring shape having a U-shaped cross section to cover the receiving portion 6 of the stator housing 2, and is rotatably supported by the housing of the refrigerant compressor with a ball bearing 11 disposed at the inner circumferential side of the rotor 4. To rotate the rotor 4 with reference to the stator housing 2 which does not rotate, a clearance is formed at the fitting portion between the rotor 4 and the stator housing 2. On the outer circumferential portion of the rotor 4, a pulley 12 is fixed by welding or the like. The rotor 4 is rotated by receiving a rotational power transmitted from an engine through a belt (not shown) which is hung on the pulley 12. The end surface of the rotor 4 facing to the armature 5 in the axial direction thereof serves as a friction surface.

The armature 5 (a transmitting member) includes an inside ring 5a and an outside ring 5b, each of which is fixed to a plate spring 14 by rivets 13 so as to form a predetermined gap with the rotor 4. Each surface of the rings 5a and 5b, which faces the friction surface of the rotor 4 through the gap, is a friction surface of the armature 5.

The hub assembly (a connecting member) includes a hub 15 fixed to an end portion of a rotary shaft (not shown) of the refrigerant compressor by a bolt (not shown), and the plate spring 14 fixed to the hub 15 by rivets 16. The plate spring 14 holds the armature 5 movably in the axial direction.

Next, a manufacturing process for producing the stator housing 2 and for filling the resin 10 into the stator housing 2 will be described.

Firstly, a plate-like housing material 2A (refer to FIG. 2) is formed into a circular shape with a predetermined thickness. Then, a drawn portion 20 is formed at the center of the housing material 2A by drawing and a hole 21 is opened at the center of the drawn portion 20 (refer to FIG. 3).

Figure 4:
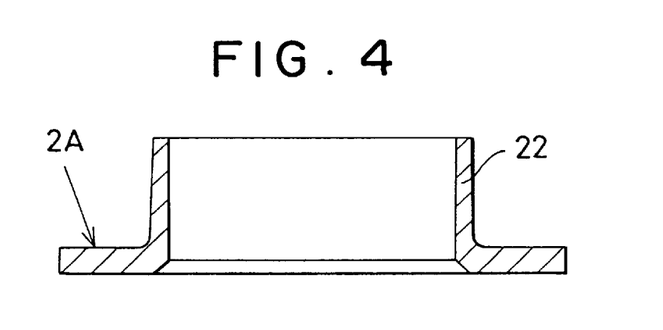
FIG. 4 is another schematic view for explaining a manufacturing process of a stator housing in the first embodiment.

Next, the inner circumferential part of the housing material 2A is stretched by squeezing, which is one of plastic deformation processes, into a cylindrical shape having a thin wall, thereby forming the inner circumferential wall 22 of the receiving portion 6 as shown in FIG. 4.

The outer circumferential part of the housing material 2A is also stretched by squeezing into a cylindrical shape having a thin wall, thereby forming the outer circumferential wall 23 of the receiving portion 6, so that the shape of the stator housing 2 is obtained as shown in FIG. 5.

Figure 7:
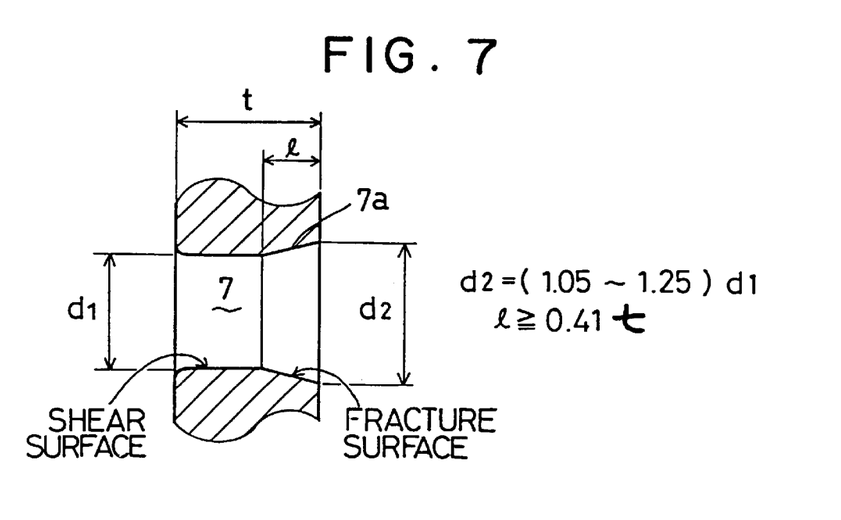
FIG. 7 is a partly enlarged cross-sectional view showing the portion indicated by an arrow VII in FIG. 6B.

Then, as shown in FIGS. 6A and 6B, the through holes 7 and a connector hole 24 for forming a connector 17 are opened on the bottom of the receiving portion 6 by pressing from the inside of the receiving portion 6 to an arm support side (from the lower side to the upper side in FIG. 6B). In the case of pressing, as shown in FIG. 7, a shear surface and a fracture surface are formed in the plate thickness direction of the stator housing 2. The shear surface forms a cylindrical hole, a cross-sectional shape of which corresponds to a shape of a punch of a pressing machine. Further, the fracture surface forms a tapered shape which becomes larger in a pressing direction toward the arm support side. The portion having the tapered shape is hereinafter called a tapered portion 7a. The diameter of the through holes 7 at the arm support side is determined by a jig (not shown) which receives the punch at the arm support side in the pressing process. FIG. 7 shows a relationship between the diameter d1 of the hole at the inside of the receiving portion 6 and the diameter d2 of the hole at the arm support side and a relationship between the length t of the through hole 7 and the length 1 of the tapered portion 7a as an example, in which d2=(1.05 to 1.25)×d1, and 1≧0.4 t.

Figure 8A:
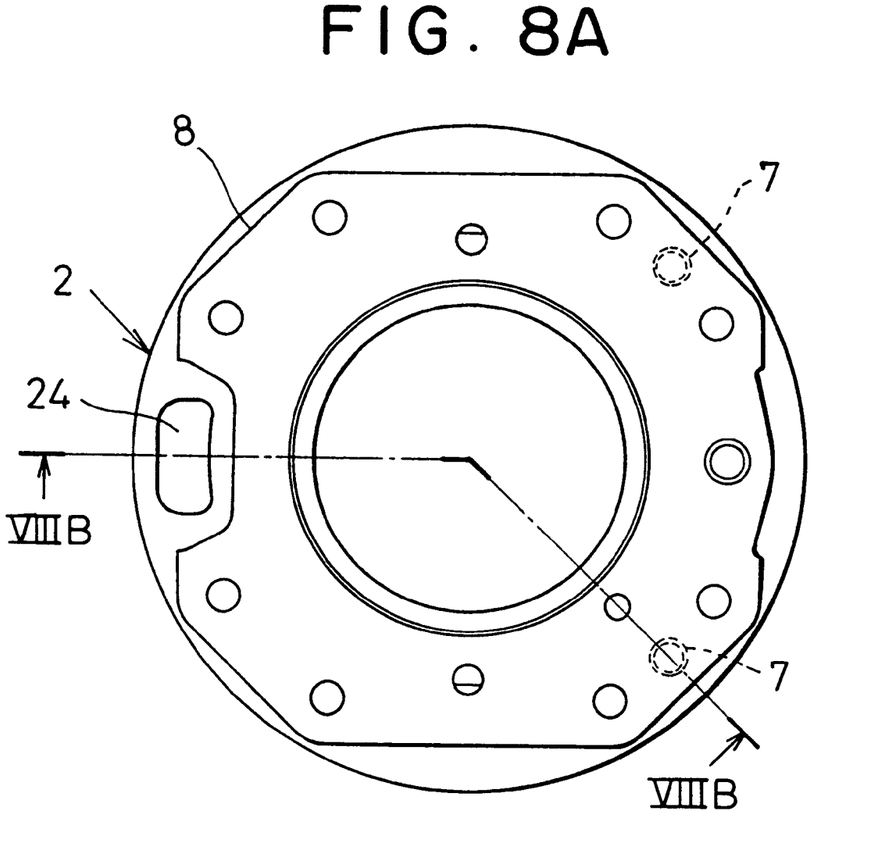
FIG. 8A is a front view taken from the arm support side showing the stator housing and an arm support fixed on the stator housing.
Figure 8B:
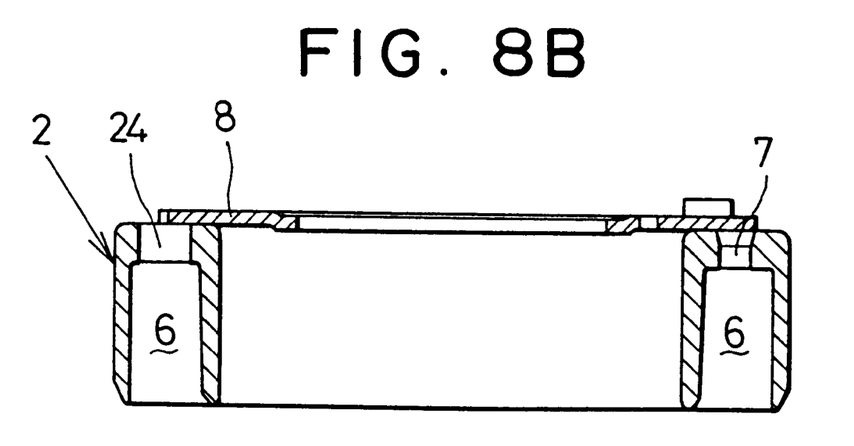
FIG. 8B is a cross-sectional view taken along the VIIIB—VIIIB line in FIG. 8A, showing the stator housing and the arm support.

Next, as shown in FIGS. 8A and 8B, the arm support 8 is fixed to the bottom of the receiving portion 6 at the side opposite to the opening of the receiving portion 6 by welding or the like. The through holes 7 are closed by the arm support 8, whereas the connector hole 24 is not closed thereby.

Figure 9A:
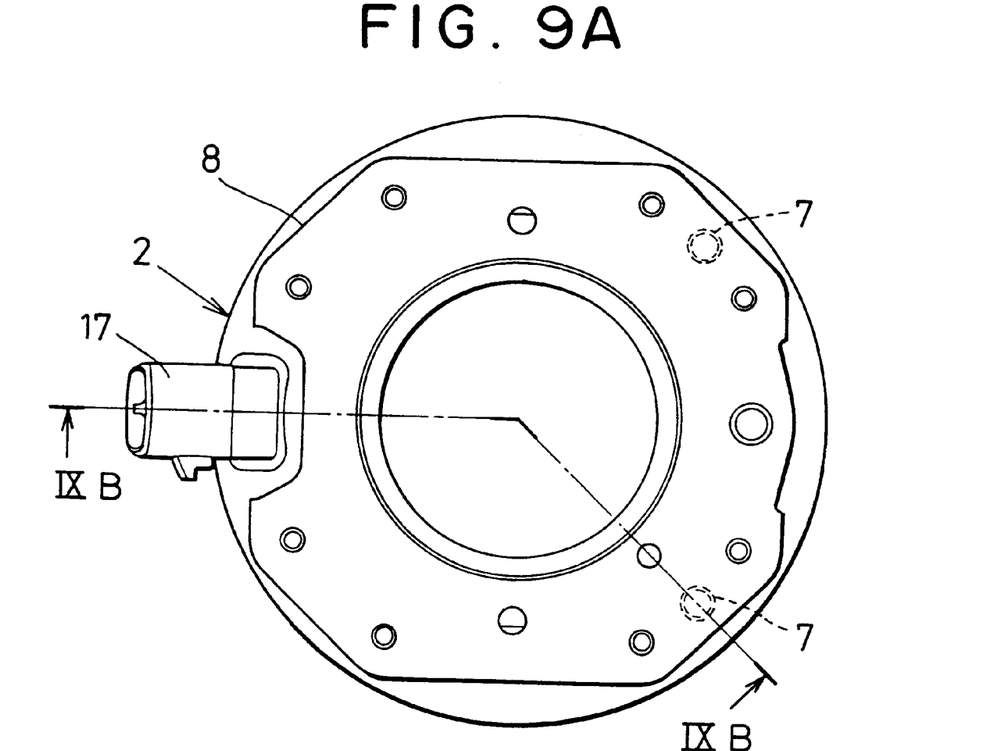
FIG. 9A is front view from the arm support side, showing a state in which a resin is filled into the stator housing.
Figure 9B:
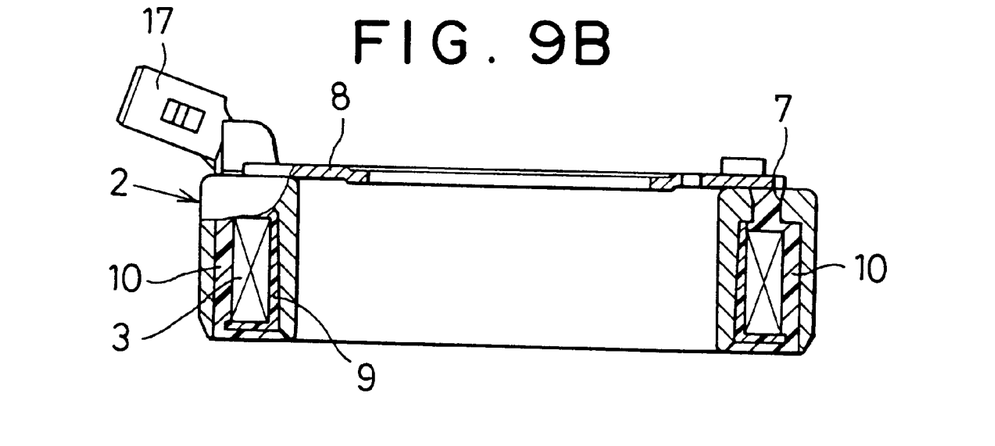
FIG. 9B is a cross-sectional view taken along the IXB—IXB line in FIG. 9A showing the state in which the resin is filled into the stator housing.

As shown in FIGS. 9A and 9B, after the exciting coil 3 wound around the spool 9 is received in the receiving portion 6, the resin 10 is injected into the space around the exciting coil 3 from the opening (the lower side in FIG. 9B) of the receiving portion 6. The resin 10 passes through the connector hole 24 and forms the connector 17. Further, the resin 10 flows into the through holes 7 through the U-shaped grooves formed on the side wall of the spool 9 and fills the through holes 7. The injected resin 10 is cooled and solidified (molded).

According to the process as described above, the exciting coil 3 received in the receiving portion 6 of the stator housing 2 is fixed by the molded resin 10.

In this embodiment, the through holes 7 having the tapered portion 7a is formed on the receiving portion 6, and the through holes 7 as well as the space around the exciting coil 3 is filled with the resin 10. Therefore, after the resin 10 is solidified (molded), the through holes 7 having the tapered portion 7a prevents the molded resin 10 from moving. As a result, it is prevented that the mold resin 10 with the exciting coil 3 comes out of the stator housing 2. Further, the through holes 7 can be opened easily by pressing, and it is not necessary to form a staked portion or a dimple on the stator housing 2. Therefore, the fixing structure according to the present invention can be provided at low cost as compared with the conventional method.

Next, a second embodiment according to the present invention will be described.

Figure 10:
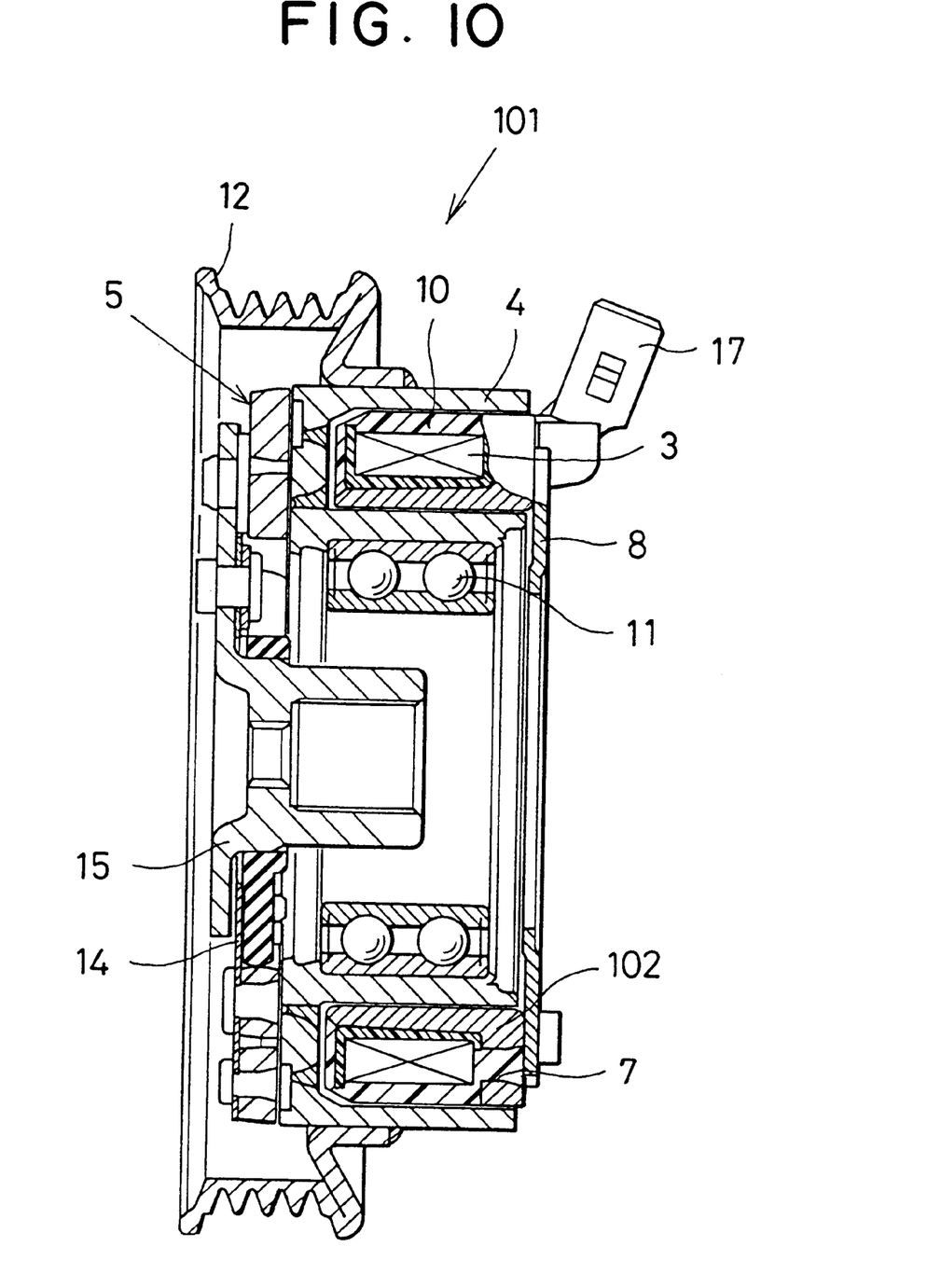
FIG. 10 is a cross-sectional view showing an electromagnetic clutch in a second embodiment according to the present invention.

FIG. 10 shows an entire cross sectional view of an electromagnetic clutch 101. In the second embodiment, the outer circumferential wall 23 (refer to FIG. 5) forming the receiving portion 6 is removed from a stator housing 102. Accordingly, it is possible to reduce the diameter of the electromagnetic clutch 101. The through holes 7 are formed in the same way as in the first embodiment, and are filled with the molded resin 10. The other features and the effects in the second embodiment are the same as those in the first embodiment.

Next, a third embodiment according to the present invention will be described.

Figure 11:
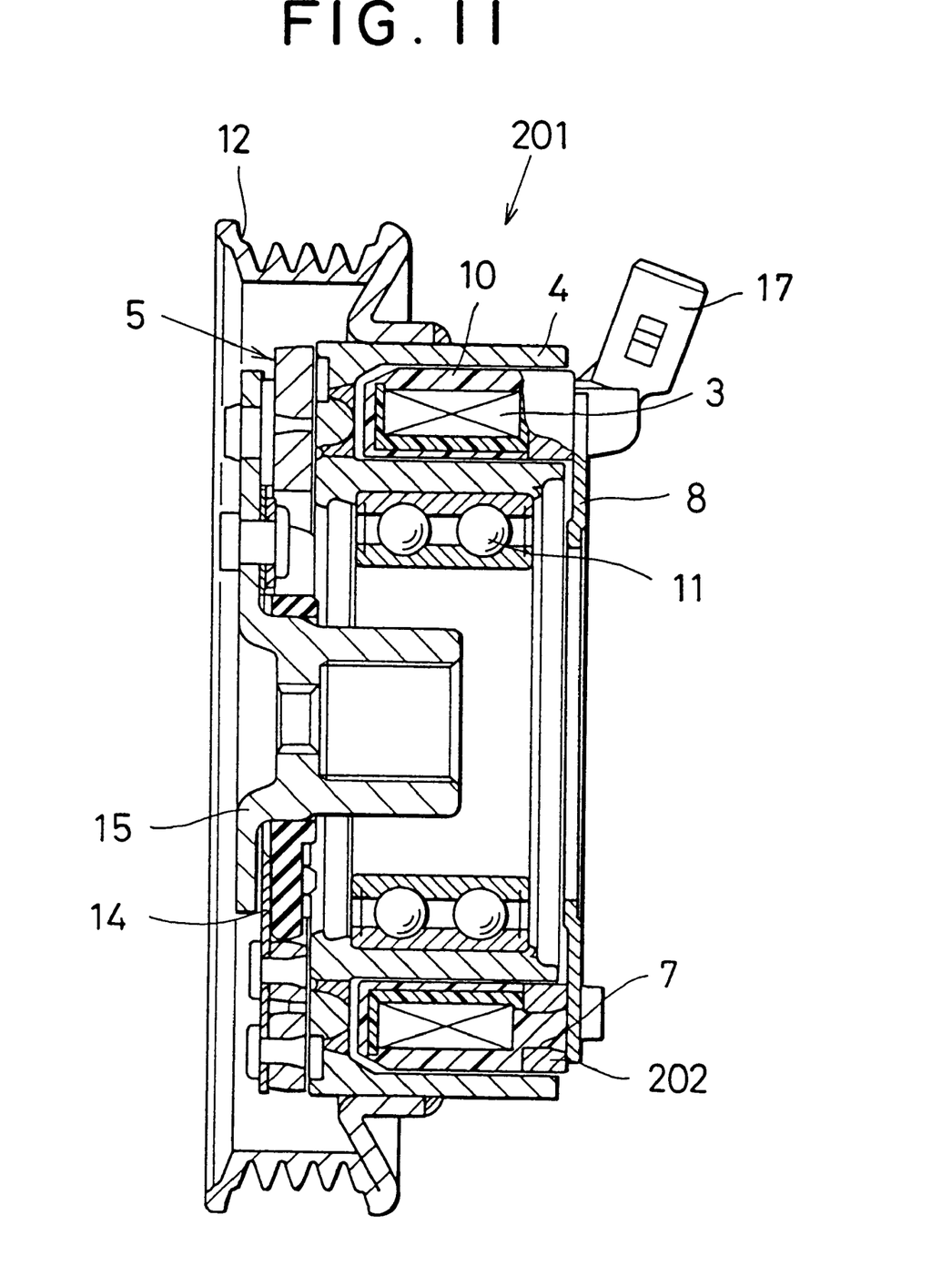
FIG. 11 is a cross-sectional view showing an electromagnetic clutch in a third embodiment according to the present invention.

As shown in FIG. 11, the inner circumferential wall 22 (refer to FIG. 5) as well as the outer circumferential wall 23 both forming the receiving portion 6 are removed from a stator housing 202. Accordingly, the diameter of the electromagnetic clutch is further reduced as compared with the second embodiment. The through holes 7 are formed in the same way as in the first embodiment, and are filled with the molded resin 10. The other features and the effects in the third embodiment are the same as those in the first embodiment.

Next, a fourth embodiment according to the present invention will be described.

Figure 12:
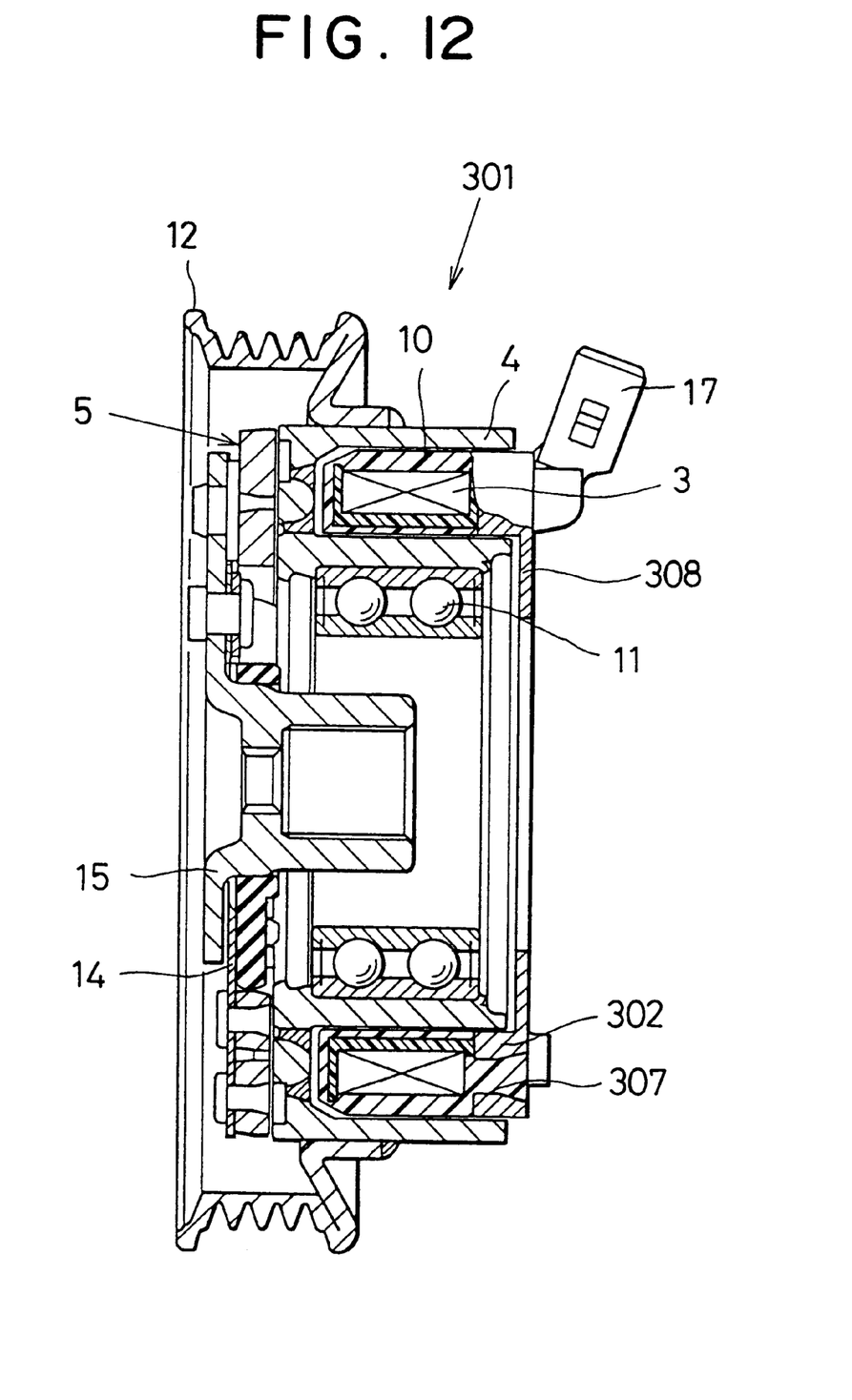
FIG. 12 is a cross-sectional view showing an electromagnetic clutch in a fourth embodiment according to the present invention.
Figure 13:
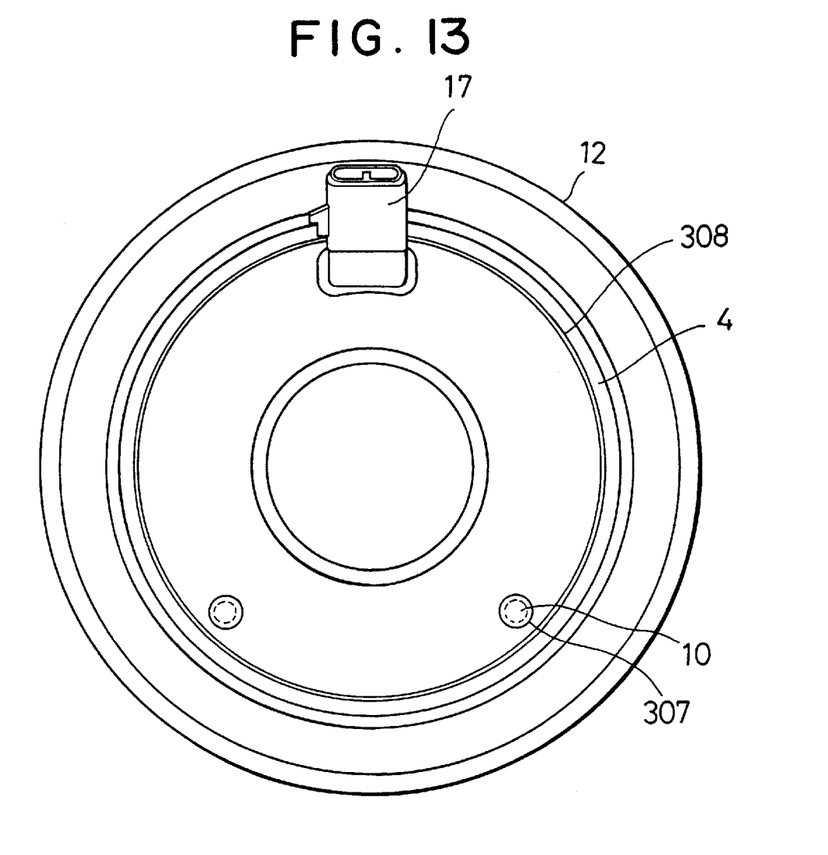
FIG. 13 is a front view from an arm support side showing the electromagnetic clutch in the fourth embodiment.

In the fourth embodiment, a stator housing 302, from which the inner circumferential wall 22 and the outer circumferential wall 23 are removed, is integrally formed with an arm support 308. In this case, through holes 307 pass through the arm support 308, and the resin 10 fills the through holes 307 up to the opening surface of the arm support 308. By integrating the arm support 308 with the stator housing 302, the number of parts can be decreased. Further, because it is not necessary for the arm support 308 to be fixed to the stator housing 302, the manufacturing process is simplified. Other features and effects in the fourth embodiment are the same as those in the first embodiment.

Figure 14:
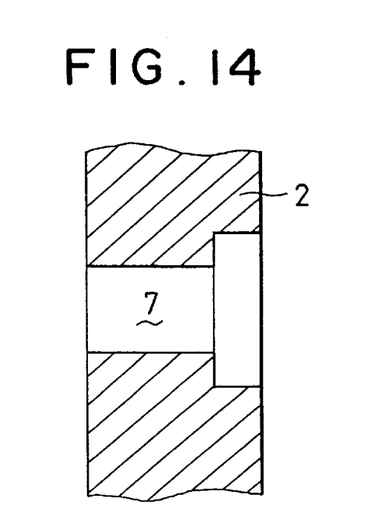
FIG. 14 is a cross-sectional view showing a through hole according to a modification.

In the embodiments, although the through holes 7 are formed by pressing so as to have the tapered portion 7a, the tapered portion 7a may be formed after forming the through holes 7. Further, the through holes 7 may have a step portion as shown in FIG. 14 in place of the tapered portion 7a so that the molded resin 10 filled in the through holes 7 is prevented from moving.

While the present invention has been shown and described with reference to the foregoing preferred embodiments, it will be apparent to those skilled in the art that changes in form and detail may be made therein without departing from the scope of the invention as defined in the appended claims.

What is claimed is:

1. An electromagnetic clutch comprising:
    an exciting coil for generating an electromagnetic force;
    a stator housing having an open space at one side and a bottom at the other side, said stator housing including a receiving portion in said open space for receiving said exciting coil;
    a molded resin filled in a space around said exciting coil, for fixing said exciting coil in said stator housing;
    said bottom having a through hole formed in an axial direction thereof, in which said molded resin is filled, said through hole including an engagement portion for suppressing said molded resin from coming out of said stator housing, said through hole being completely filled with said molded resin; and
    a support member mounted on said stator housing, said support member closing said through hole, said support member being in contact with said molded resin filling said through hole.

2. An electromagnetic clutch according to claim 1, wherein said stator housing is cylindrical.

3. An electromagnetic clutch according to claim 2, wherein said stator housing has an inner wall and an outer wall so as to form said open space therebetween.

4. An electromagnetic clutch according to claim 1, wherein said engagement portion is formed in a shape in which an opening area at a side of said exciting coil is smaller than that at the other side.

5. An electromagnetic clutch according to claim 4, wherein said engagement portion is formed in a tapered shape.

6. An electromagnetic clutch according to claim 5, wherein,
    said tapered shape having a small diameter portion having a diameter d1 and a large diameter portion having a diameter d2, and
    said d1 and d2 satisfy the following relationship:

$$1.05 \times d1 \leq d2 \leq 1.25 \times d1.$$

7. An electromagnetic clutch according to claim 5, wherein,
    said through hole has an axial length t and said tapered portion has an axial length 1, and
    said t and 1 satisfy the following relationship:

$$1 \geq 0.4 \times t.$$

8. An electromagnetic clutch according to claim 4, wherein said engagement portion is formed in a step shape having a small diameter portion at said one side and a large diameter portion at the other side.

9. An electromagnetic clutch according to claim 1, said through hole is formed by pressing from said one side to the other side in said axial direction.

10. An electromagnetic clutch for transmitting a rotational power from an engine to a compressor for forming a refrigerating cycle, said electromagnetic clutch comprising:
    a stator including a stator housing having an open space at one side and a bottom at the other side, said stator housing including a receiving portion in said open space for receiving said exciting coil;
    an exciting coil for generating an electromagnetic force when an electricity is supplied thereto;
    a molded resin filled in a space between said stator housing and said exciting coil, for fixing said exciting coil in said stator housing;
    a support member mounted on said bottom of said stator housing, for fixing said electromagnetic clutch to said compressor;
    a rotating member rotatably disposed so as to face said exciting coil at said open end, for receiving said rotational power from said engine;

a connecting member for being connected to the compressor; and a transmitting member fixed to the connecting member and movably disposed in an axial direction of said exciting coil so as to face said rotating member with a predetermined gap at an opposite side to the exciting coil, for transmitting the rotational power from said rotating member to said compressor through said connecting member when said transmitting member is attracted to said rotating member by an electromagnetic force generated by said exciting coil, wherein, said bottom has a through hole formed in an axial direction thereof, in which said molded resin is filled, said through hole including an engagement portion for suppressing said molded resin from coming out of said stator housing, said through hole being completely filled with said molded resin, said support member closing said through hole, said support member being in contact with said molded resin filling said through hole.

11. An electromagnetic clutch according to claim 10, wherein said stator housing is cylindrical.

12. An electromagnetic clutch according to claim 11, wherein said stator housing has an inner wall and an outer wall so as to form said open space therebetween.

13. An electromagnetic clutch according to claim 10, wherein said engagement portion is formed in a shape in which an opening area at a side of said exciting coil is smaller than that at the other side.

14. An electromagnetic clutch according to claim 13, wherein said engagement portion is formed in a tapered shape.

15. An electromagnetic clutch according to claim 14 wherein, said tapered shape having a small diameter portion having a diameter d1 and a large diameter portion having a diameter d2, and said d1 and d2 satisfy the following relationship:

$$1.05 \times d1 \leq d2 \leq 1.25 \times d1.$$

16. An electromagnetic clutch according to claim 14, wherein, said through hole has an axial length t and said tapered portion has an axial length 1, and said t and 1 satisfy the following relationship:

$$1 \geq 0.4 \times t.$$

17. An electromagnetic clutch according to claim 13, wherein said engagement portion is formed in a step shape having a small diameter portion at said one side and a large diameter portion at the other side.

18. An electromagnetic clutch according to claim 10, wherein said through hole is formed by pressing from said one side to the other side in said axial direction.

19. An electromagnetic clutch comprising:

an exciting coil for generating an electromagnetic force;

a stator housing having an open space at one side and a bottom at the other side, said stator housing including a receiving portion in said open space for receiving said exciting coil; and a molded resin filled in a space around said exciting coil, for fixing said exciting coil in said stator housing, wherein, said bottom has a connecting through hole formed in an axial direction and filled with said molded resin to provide access for electrical connection to said exciting coil; and said bottom has a retaining through hole formed in said axial direction, said retaining through hole including an engagement portion for suppressing said molded resin from coming out of said stator housing, said retaining through hole being completely filled with said molded resin.

20. The electromagnetic clutch according to claim 19 further comprising a support member mounted on said bottom of said stator housing, said support member closing said retaining through hole, said support member being in contact with said molded resin filling said retaining hole.

21. An electromagnetic clutch comprising:

an exciting oil for generating an electromagnetic force;

a stator housing having an open space at one side and a bottom at the other side, said stator housing including a receiving portion in said open space for receiving said exciting coil;

a molded resin filled in a space around said exciting coil, for fixing said exciting coil in said stator housing;

said bottom having a through hole formed in an axial direction thereof, in which said molded resin is filled, said through hole including an engagement portion for suppressing said molded resin from coming out of said stator housing; and a support member mounted on said stator housing, said support member completely closing said through hole.

* * * * *

UNITED STATES PATENT AND TRADEMARK OFFICE
CERTIFICATE OF CORRECTION

PATENT NO. : 5,924,537
DATED : July 20, 1999
INVENTOR(S) : Masashi Tobayama et al It is certified that error appears in the above-identified patent and that said Letters Patent is hereby corrected as shown below:

Title Page, [56] References Cited, Add References:
    3,995,244  11/1976  Sayo
    4,935,713  6/1990  Bekheet
    5,307,038  4/1994  Ishimaru
    5,331,730  7/1994  Brinn, Jr.
    5,121,093  6/1992  Matsushita Col. 2, line 42, "views" should be --view--

Col. 8, line 33, claim 21, "oil" should be --coil--

Signed and Sealed this

Ninth Day of May, 2000

Attest:

Q. TODD DICKINSON

Attesting Officer      *Director of Patents and Trademarks*